(12) United States Patent
Ashrafzadeh et al.

(10) Patent No.: US 7,933,733 B2
(45) Date of Patent: Apr. 26, 2011

(54) ATTRIBUTE SENSING PROCESSES

(75) Inventors: Farhad Ashrafzadeh, Stevensville, MI (US); Ali R. Buendia-Garcia, Coloma, MI (US); Richard A. McCoy, Stevensville, MI (US); Yingqin Yuan, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 152 days.

(21) Appl. No.: 12/256,491

(22) Filed: Oct. 23, 2008

(65) Prior Publication Data

US 2010/0106446 A1    Apr. 29, 2010

(51) Int. Cl.
*G01C 25/00*    (2006.01)
(52) U.S. Cl. ............ 702/116; 99/285; 340/686.1; 702/1
(58) Field of Classification Search .................... 702/50, 702/137, 187, 188, 1, 116; 99/285; 600/564; 73/114, 149, 596, 597; 340/540, 686.1
See application file for complete search history.

(56) References Cited

U.S. PATENT DOCUMENTS

| | | | |
|---|---|---|---|
| 5,187,744 A | 2/1993 | Richter | |
| 5,305,381 A | 4/1994 | Wang et al. | |
| 5,457,745 A | 10/1995 | Wang | |
| 5,836,563 A | 11/1998 | Hsin-Yung | |
| 6,341,271 B1 | 1/2002 | Salvo et al. | |
| 6,634,279 B2 | 10/2003 | D'Antonio et al. | |
| 6,785,567 B2 | 8/2004 | Kato | |
| 6,888,940 B1 | 5/2005 | Deppen | |
| 6,966,533 B1 | 11/2005 | Kalis et al. | |
| 7,080,812 B2 | 7/2006 | Wadsworth et al. | |
| 7,158,092 B2 | 1/2007 | Shen | |
| 2003/0174554 A1 | 9/2003 | Dunstone et al. | |
| 2004/0030532 A1* | 2/2004 | Boldt et al. | .................. 702/187 |
| 2006/0064257 A1* | 3/2006 | Pennington et al. | ............ 702/50 |

FOREIGN PATENT DOCUMENTS

| | | |
|---|---|---|
| EP | 0510686 B1 | 7/1997 |
| EP | 1650536 A2 | 4/2006 |
| EP | 1777467 A1 | 4/2007 |
| EP | 1810598 A1 | 7/2007 |
| JP | 7218320 A | 8/1995 |
| JP | 2001264146 A | 9/2001 |
| JP | 2001264147 A | 9/2001 |
| JP | 2002291844 A | 10/2002 |
| JP | 2004283248 A | 10/2004 |
| JP | 2008216165 A | 9/2008 |
| SK | 284643 B6 | 8/2005 |
| WO | 99/01971 A1 | 1/1999 |
| WO | 02100728 A2 | 12/2002 |
| WO | 03101022 A2 | 12/2003 |
| WO | 2005093377 A2 | 10/2005 |
| WO | 2006/126818 A1 | 11/2006 |

* cited by examiner

*Primary Examiner* — John H Le
(74) *Attorney, Agent, or Firm* — Robert A. Bacon; McGarry Bair PC (57) ABSTRACT

Methods for determining an attribute of a substance in a container in response to an access event. The methods include a method for determining an attribute of a substance including activating the sensor in response to an access event and transmitting, in response to the activating, an output of the sensor providing an indication of an attribute of the contents. The methods also include a method having the steps of associating a sensor having an identifier with the container; and receiving the identifier and an output of the sensor providing an indication of the amount of the contents.

34 Claims, 10 Drawing Sheets

ATTRIBUTE SENSING PROCESSES

TECHNICAL FIELD

The exemplary embodiments relate to methods of determining an attribute of a substance stored in a container using a sensor associated therewith.

BACKGROUND

There are numerous containers of various types configured to store all matter of substances. However, determining attributes of the substance stored in the container, which is often useful to know, may be difficult to ascertain. Containers that can self-report attributes such as the amount of their contents could save significant amounts of manual measuring or guesswork. Additionally, many secondary applications may be available from having a system of containers that self-report attributes of their contents.

In a kitchen environment, knowing attributes of the contents of containers, such as the amount, type or quality of food substances, can facilitate more informed consumption and purchase decisions. In a household kitchen, particularly when children have access to the kitchen, it may be difficult to regulate or keep track of the aging, spoilage and removal of food substances stored in containers. In a commercial kitchen including multiple food preparers rapidly preparing dishes in a stressful environment, the task of tracking the quality and amounts of food substances in numerous containers can be even more challenging.

In a laboratory environment, chemicals, and the like, may require detailed condition or usage tracking. For instance, the substances may be expensive or hazardous. Such usage tracking may require careful removal and measuring of the substance and a recordation of the amount removed and other attributes in a logbook.

Without accurate inventory determinations, maintaining inventory information may be an ad hoc process. In one approach, inventory trends may be learned over time. However, any identified trends may be upset by unexpected usage. Accordingly, a device to accurately report the amount of a substance stored in a container or other attributes at any given time may be useful in an inventory system.

BRIEF SUMMARY

Methods for determining an attribute of a substance in a container in response to access events are disclosed.

An exemplary method for determining an attribute of a substance stored in a container may include determining the amount of a substance in a container having a lid by \associating a sensing device with the substance, the sensing device configured to provide an indication of the attribute of the substance stored in the container; activating the sensor concurrently with an access to the container; sensing with the sensor the indication of the attribute of the substance in response to the detecting; and communicating the indication of the attribute to a remote device.

According to another exemplary method, a sensing device configured to provide an indication of an attribute of the substance stored in the container is associated with the substance in a container. The sensor is activated concurrently with an access to the container and an indication of the attribute is transmitted to a remote device.

According to yet another exemplary method, an attribute of the contents of a container may be determined by associating an identifier of at least one of the container and the substance in a remote data system; and receiving the identifier and an output of the sensor providing an indication of the attribute of the contents.

According to still another exemplary method, an attribute of the contents of a container may be determined by providing a sensor within an openable lid of the container; activating the sensor in response to one of the opening and closing of the lid; and transmitting, in response to the activating, an output of the sensor providing an indication of an attribute of the contents.

DETAILED DESCRIPTION OF THE EMBODIMENTS

Referring now to the drawings, preferred embodiments of the present invention are shown in detail. Although the drawings represent embodiments of the present invention, the drawings are not necessarily to scale and certain features may be exaggerated to better illustrate and explain the present invention. The embodiments set forth herein are not intended to be exhaustive or otherwise limit the invention to the precise forms disclosed in the following detailed description.

The drawings and the below detailed description relate generally to devices for detecting attributes of substances.

As used herein, a substance is any useful material that can be stored in a container. A consumable substance is a substance that may be stored in varying amounts in containers and may be partially dispensed or removed from the container over a period of time. An attribute of a substance is any information about a substance, including measurable and non-measurable information about the substance that can be stored for later retrieval, including but not limited to its physical or chemical properties, its impact upon its environment, and its amount.

Non-measurable attributes are attributes about the substance that may be stored with the substance or with the container of the substance, whether the attributes would or would not have been measurable by an appropriate sensor. Examples of non-measurable attributes include quantity of consumable pieces, quantity by volume or by weight, date of manufacture, manufacturer, data about its transit from manufacturer, distributor, market, and consumer, data about the temperature during transit, nutritional information like calories, fat grams, % daily allowance of essential vitamins and minerals, a list of medical conditions under which a consumable should not be consumed, data about the relationship between the Consumable Meta Data and known diets, known medical conditions, and known reactions to known medications, and the like.

Amount attributes are attributes directly reflecting the amount of the substance available for future use including weight, volume, mass, height, and count. An attribute indicative of the amount are attributes that may be used or processed to infer or calculate the amount of substance, such as the vapor pressure in a container, the light transmissivity or electrical inductance, capacitance, resistance, reactance, or impedance of the substance. An attribute of the environment is any characteristic of the environment inside of the container, the environment outside of the container, or of the container itself.

As used herein, information or data includes any stored information, such as genealogical and life cycle information, relating to the substance, the container, the manufacturer, the environment, the user or users. Information may be measurable or non-measurable, event based, historical, or identifier information.

Since there may be a plurality of containers, each with a substance, there may need to be a unique identifier identifying each container or each substance that may be paired with an attribute measurement of a substance so that the value of the measurement can be uniquely identified per its meaning at a later time and by subsequent intelligent processes. Such identifier may be associated with the substance, the container, the sensor, or the transmitter and such association may occur at the time of creation or assembly of the components, the time of first adding substance to the container, or the time of introducing the container to a system using a plurality of containers. The identifier may also be dynamically generated, for example, from one or more measurable and non-measurable attributes.

Similarly, since there may be a plurality of attributes applicable to a substance, attributes may need to be uniquely identifiable so that when a collection of attributes each having a value is either stored or transmitted, each respective value is paired with its attribute identifier so that the value can be uniquely identified per its meaning at a later time and by a subsequent intelligent process. In the simplest case, where there is only an amount attribute, the system may assume that all values are amount values with an inherent attribute identifier with the meaning of amount.

A container of substance is any container capable of temporarily holding an amount of substance. A lid is a feature of any container which may be opened to permit or improve access to the substance in the container. A dispenser is any feature of a container which permits or drives the active or passive filling of substance into the container or which permits or drives the active dispensing of substance from the container. A main body of a container is any portion of the container which is not a lid or dispenser. A portable container is a container that is intended to be periodically manually moved within a use environment during its lifetime.

A sensor is any active or passive device capable of obtaining information in a form which may be either actively or passively communicated to another device for use by the other device. A communication of information is the delivery of information from a first device to a second device either by the active transmission from the first device to the second device or by the reading of the second device by the first device. A transmitter is any device which wirelessly communicates information to other devices using any form of active or passive transmission including optical or electromagnetic waves.

A triggering event is an event used as an input by a system to begin a process. Examples of triggering events are execution of a firmware or software, an access event as defined below, receiving a network message, a clock tick, a period of a function like a sine wave, and the like. An access device of a container is any feature of a container that permits access to the substance, including any lid or dispenser. An access event relating to a container of substance is any event indicative of accessing the substance in a container such as an opening, closing, dispensing or filling event. A local event, device, process or step is an event, device, process or step existing or occurring in or about the container. A remote event, device, process or step is an event, device, process or step existing or occurring remote from the container. A notification is specific information derived from a system which is a value to a user or to an observing computer program on a remote device. A notification event is an event resulting in the immediate availability of information to a user or the delivery of information to a user, such as audible announcement, a visible display on a user interface, a communication to phone or other portable consumer electronic device, or a notification message either broadcast on at least one computer network or directed to at least one computer containing a software component configured to receive the notification.

Power and energy include any form of power or energy usable by a device for the performing an operation and includes electrical, mechanical and chemical power. A power generator is any device capable of generating a usable form of power or energy. A power converter is any device capable of converting one form of power to another such as converting chemical power to electrical power, or converting AC electrical power to DC electrical power.

Figure 1:
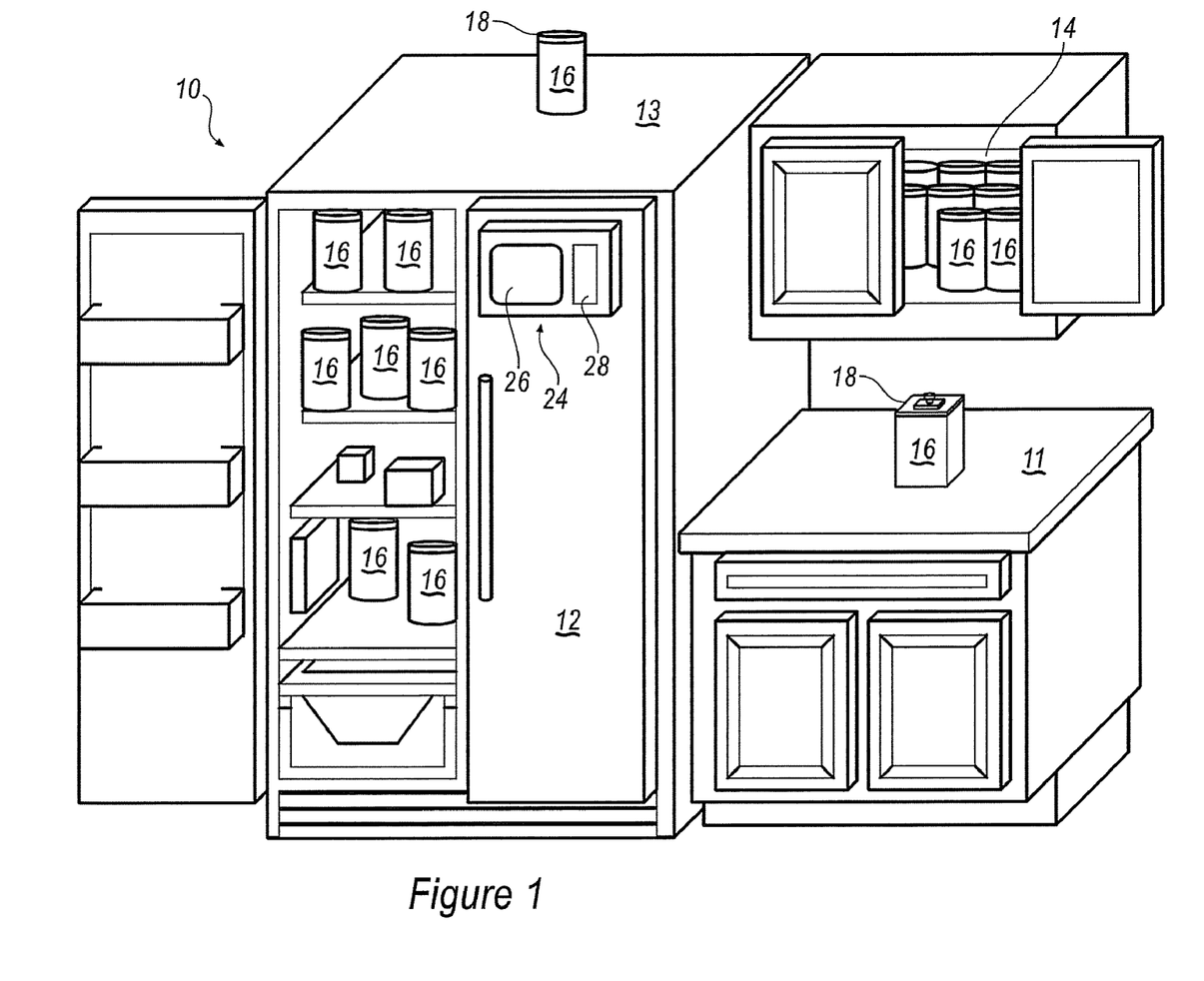
FIG. 1 is a perspective partial view of a storage and use environment and in particular depicts a kitchen including a refrigerator and cabinets each holding numerous containers.

Referring to FIG. 1, a storage and use environment 10 such as a kitchen, medical center or research laboratory, may include storage compartments such as a refrigerator 12 and cabinetry 14 as well as additional cupboards, drawers, pantries and free standing storage furniture, not shown. The kitchen may also include processing compartments such as ovens, not shown. The kitchen may further include open storage and use areas such as countertop 11 and the top surface 13 of the refrigerator 12 as well as open shelves, tables, ranges, and cook tops, not shown.

As used herein, a storage and use environment 10 may alternatively be any building, region or room of a building, compartment, or structure wherein many consumable substances are stored and used. For example, the storage and use environment may be a pantry, walk-in refrigerator, shelving, a trunk, a lunch box, a cabinet, a drawer, an oven, an interior compartment of an appliance, a dryer, a swimming pool a hot tub, a water service room, a pool house, a supply closet, an engine compartment, a building, a room, a laboratory, a kitchen, a laundromat, a dispensing pharmacy or a restroom.

The manufacture of containers 16 which can self report data about their contents is contemplated. Specific embodiments of self-reporting containers 16, as well as some additional related components, methods and features will now be described. Other examples of self-reporting containers are described in the following related applications filed concurrently herewith: U.S. Patent Application entitled "LID BASED AMOUNT SENSOR", Ser. No. 12/256,507, U.S. Patent Application entitled "MODULAR ATTRIBUTE SENSING DEVICE," Ser. No. 12/256,506, U.S. Patent Application entitled "METHOD OF INVENTORY MANAGEMENT," Ser. No. 12/256,490, U.S. Patent Application entitled "SYSTEM AND METHOD FOR TRACKING INVENTORY HISTORY," Ser. No. 12/256,492, U.S. Patent Application entitled "INVENTORY COMPONENT ACTIVATION," Ser. No. 12/256,498, U.S. Patent Application entitled "CONSUMABLES INVENTORY MANAGEMENT METHOD," Ser. No. 12/256,495, U.S. Patent Application entitled "INTRODUCTION OF A SELF-REPORTING PORTABLE CONTAINER INTO AN INVENTORY SYSTEM," Ser. No. 12/256,500, and U.S. Patent Application entitled "INTRODUCTION AND ACTIVATION OF A SELF-REPORTING PORTABLE CONTAINER INTO AN INVENTORY SYSTEM," Ser. No. 12/256,502, each of which is incorporated herein by reference in its entirety.

A plurality of containers 16 are distributed around the storage and use environment 10. Some containers 16 may be enclosed in a storage unit, such as a refrigerator 12 or in the cabinetry 14, or may be in an unconfined location, such as the countertop 11 or on the top surface 13 of the refrigerator. Containers 16 generally include a lid 18 for enclosing a substance 20 being contained. As shown in the drawing, containers 16 may, for example, be glass jars 16' with twist off lids 16' or tins 16" with pull-off lids 18". Alternatively, containers 16 may be of various other types, including plastic tubs with snap-off covers, boxes with attached movable interlocking cover flaps, covered pots or pans, medicine bottles, and dispenser storage compartments, not shown.

Figure 2A:
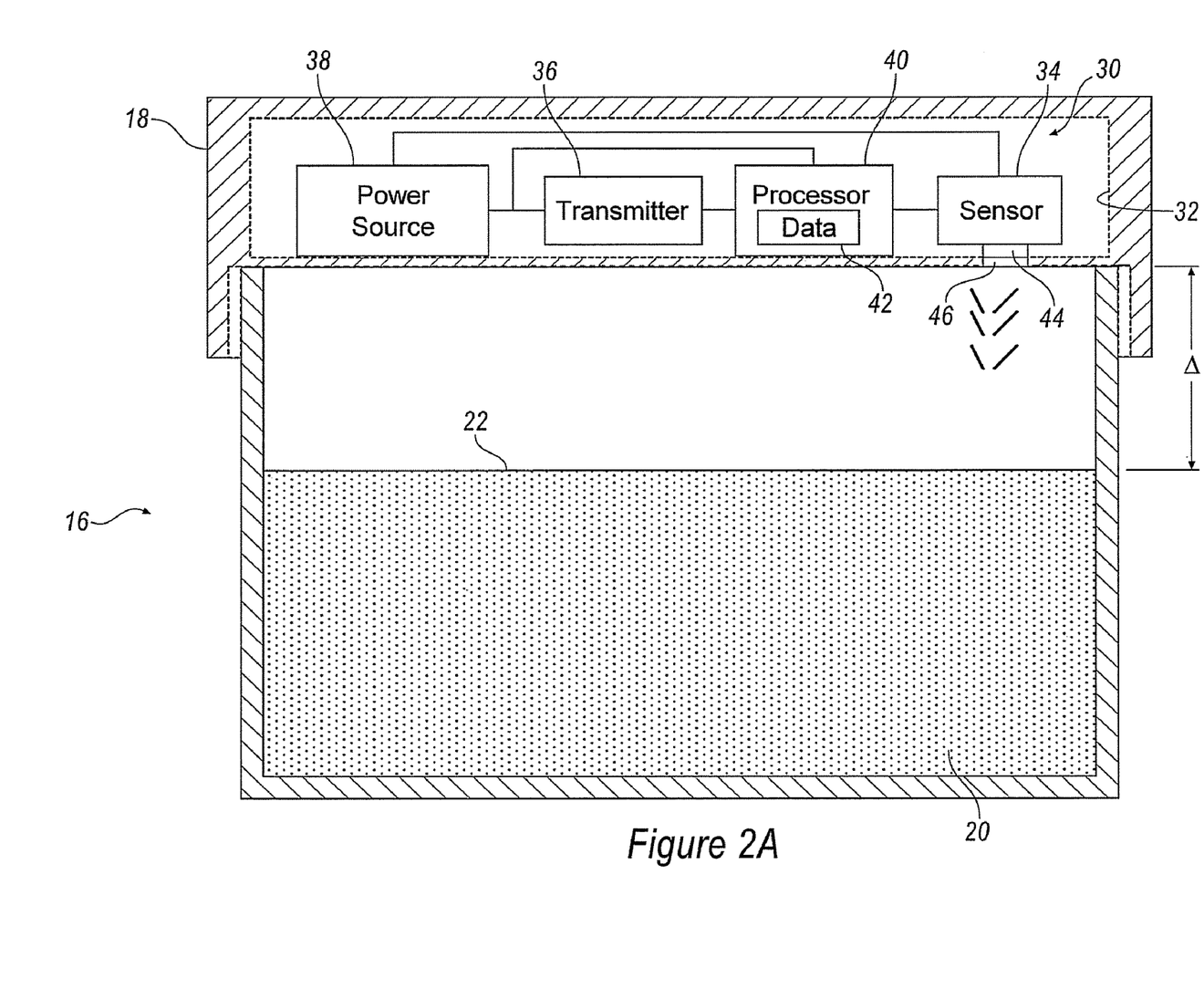
FIG. 2A is a partially schematic side, cut away view of a container containing a substance with an attribute sensing device mounted to the lid of the container.
Figure 2B:
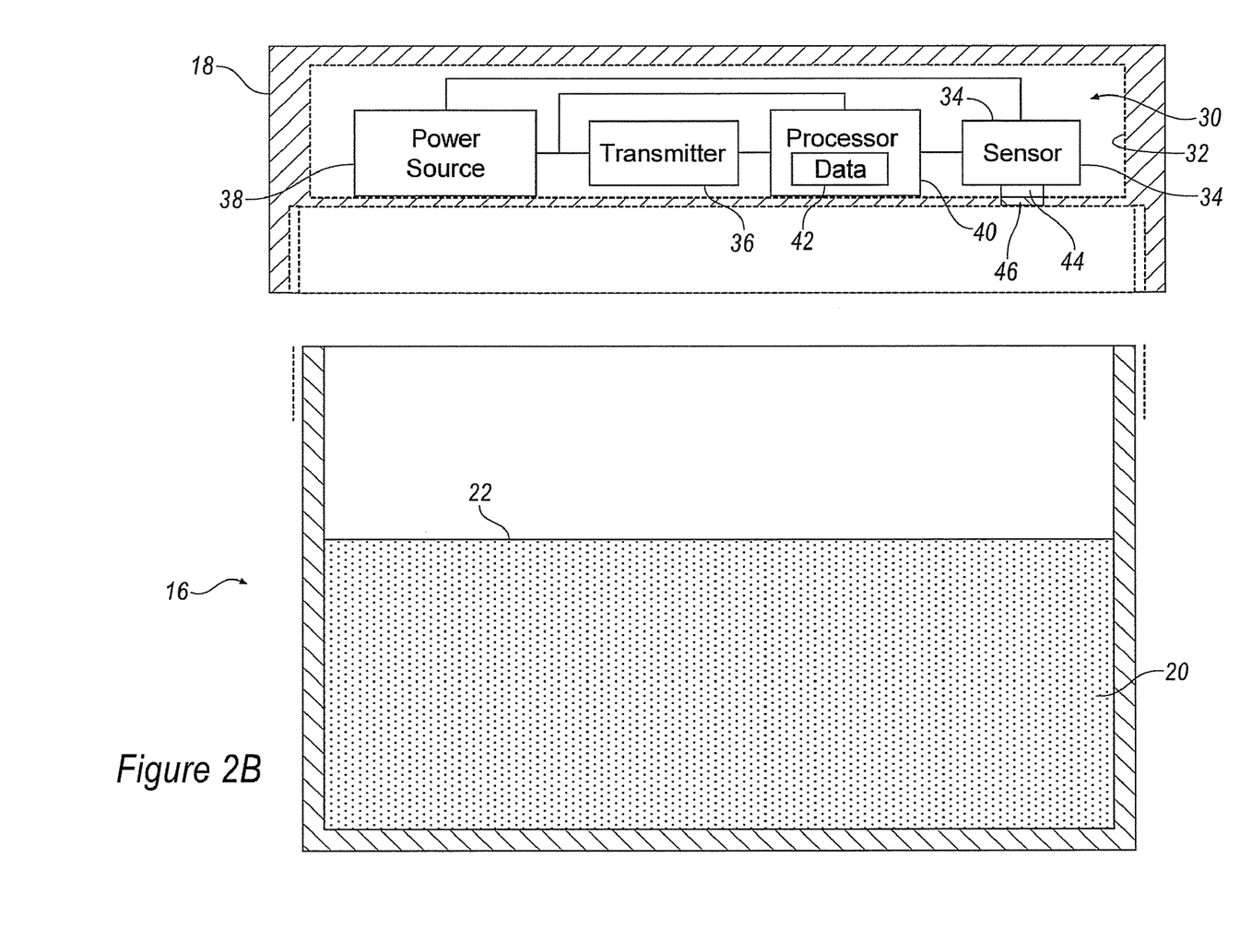
FIG. 2B is a partially schematic side, cut away, exploded view of the container of FIG. 2A showing the lid removed from the container.

Referring to FIGS. 2 and 2A, a container 20 may be provided with an attribute sensing device 30. Attribute sensing device 30 may be configured to determine at least one attribute of the substance 20 that is disposed in container 16. The attribute sensing device 30 may advantageously be provided in the lid 18 of the container 16, such as in a compartment 32 formed in the lid. Providing the sensor in the lid 18 may be advantageous for locating the sensor as well as for making the attribute sensing system 30 easily transferable to a different container. Alternatively, for some purposes, the attribute sensing device 30 may be wholly or partially disposed outside of the container 16.

Moreover, in a storage and use environment 10, multiple containers 16 may each be provided with an attribute sensing device 30 to independently determine at least one attribute of each substance 20 contained in each container. Furthermore, some containers 16 may have more than one attribute sensing device 30, each sensing a different attribute of the substance 20 in the container. A control unit 24, illustrated in FIG. 1 and discussed later herein, may be provided to receive and process data from multiple containers 16. Control unit 24 may include a receiver, not shown, a display 26 and a control interface 28, each described later.

Referring again to FIGS. 2 and 2A, in one exemplary approach, attribute sensing device 30 may include a sensor 34, a transmitter 36, a power source 38, a processor 40, and at least one element of data 42. Sensor 34, processor 40, and transmitter 36 are communicatively coupled. Power source 38 may provide electrical power to sensor 34, processor 40, and/or transmitter 36 through electrical transmission wires connected thereto.

Sensor 34 may include a sensing capability configured to measure an attribute of the substance 20 and an output capability to output a reading of the Sensor 34 to the processor 40. In the example illustrated in FIGS. 2 and 2A, sensor 34 may be configured to sense the distance (Δ) between sensor 34 and a surface 22 of substance 20. Sensor 34 of attribute sensing device 30 may be attached to container 16 at a fixed reference point to provide consistent measurements of distance Δ. In the illustrated exemplary approach, the reference point may be associated with lid 18. The reference point may represent the uppermost limit of surface 22, such as a fill line of container 16. The amount of substance 20 may be determined based on the measured distance Δ in relation to the physical shape of container 16.

Sensor 34 may utilize any of a number of sensing techniques. In one exemplary approach, sensor 34 employs an acoustic sensing technique to measure the distance Δ. A sensor 34 using an acoustic sensing technique may include an ultrasonic generator, an ultrasonic receiver, a timer, and a processor, not shown. An ultrasonic pulse or plurality of pulses may be generated and directed at substance 20. The pulse may reflect off the surface of substance 20 and be collected by the receiver. The timer may record the time between the generation and reception of the pulse. Distance Δ may be calculated based on the recorded time with respect to the speed of sound.

In another exemplary approach, sensor 34 may employ a capacitance sensing technique to measure the distance Δ. The capacitance sensing technique provides a first capacitance plate and an electrical charge sensing element. Surface 22 of substance 20 acts as a second capacitance plate. The first plate is charged to create an electrostatic field. The field is affected by distance Δ to surface 22 in a manner that may be perceived by the sensing element. The sensed difference in the field may be used with a calculation or look-up table to determined distance Δ.

Still other sensing techniques may be used to sense the distance Δ. Alternatively, the sensor 34 may measure other attributes of the substance 20, such as volume, color, temperature, pressure, humidity, texture, and presence of gas chemicals. Sensing technologies that may be used by the sensor 34 include inductive sensing, resistive sensing, evaporative gas sensing, image sensing, pressure sensing, float sensing or other mechanical sensing, strain gauge or force sensing, optical recognition, spectroscopy, thermal imaging, etc.

It is to be understood that the list of attributes being sensed and technologies for sensing provided herein is not an exhaustive list. Additional sensing technologies may also be suitable, e.g., inductive sensing, resistive sensing, evaporative gas sensing, image sensing, pressure sensing, float sensing or other mechanical sensing, strain gauge or force sensing, etc. An inductive sensor may pass a current through an inductive loop creating a magnetic field. A metal substance 20 in the presence of the magnetic field produced by the loop may effect the inductance of the loop. The change in inductance may be sensed by the inductive sensor to determine the proximity of the substance 20 to the sensor 34. A strain gauge sensor may measure deformation or strain of the container 16 cause by the substance 20. A foil pattern may be deformed by the strain thereby altering its resistive properties. The change in resistance may be measured and used to determine an indication of the amount of the substance 20. A float sensor may be used with a liquid substance 20. A float may ride against a vertically disposed set of contacts. The float may therefore complete a circuit at a set of contacts corresponding to the surface level of the substance 20. A pressure or force based sensor such as a scale may be used to determine the weight of the substance 20. The weight may be used along with a known density of the substance in order to determine an indication of the amount of the substance 20.

An aperture 44 may be provided in the compartment 32 in the lid 18 to facilitate operation of sensor 34. In another exemplary approach, aperture 44 may be covered with a protective element 46. Protective element 46 may further be transparent to the sensor 34 or may, for example, comprise a lens for an IR or optical based sensor 34.

The sensor 34 provides an output relating to the attribute of the substance 20 for use by the processor 40. In one exemplary approach, the output capability of the sensor 34 may simply be the communication wires connecting sensor 34 to the processor 40 and/or to the transmitter 36. However, in other exemplary approaches, output element may format or adapt the reading of sensing element prior to output. For instance, the output of sensing element may require analog to digital conversion which may be provided by an analog to digital converter of output element.

The processor 40 of attribute sensing device 30 receives the output of the sensor 34. Processor 40 may be a general purpose microprocessor. Such a processor may provide a predefined instruction set that can be used to program device 30 with very flexible control software. However, in another exemplary approach, processor 40 may merely include circuitry to allow the level reading of sensor 34 to be transmitted by transmitter 36.

Processor 40 may include data 42, which may include at least one element of metadata. In one exemplary approach data 42 may be permanently embedded in processor 40. For instance data 42 may be a metadata element that provides an identifier. The identifier may identify the device 30, the container 16, the substance 20, or a class of the substance 20. Moreover, in a storage and use environment 10 including a plurality of containers 16, the identifier may uniquely identify a particular attribute sensing device 30. In another exemplary approach, some or all of data 42 may be dynamically modifiable. Processor 40 may include a memory storage device such as flash memory, an EEPROM, etc., which holds data 42. Attribute sensing device 30 may additionally include a receiver to receive new data 42.

Data 42 is not limited to being only an identifier and may include many other possible items. Data 42 may include an indication of a prior attribute measurement of the substance 20. The prior measurement may be compared to the current measurement to allow for a determination of a status change in the measured attribute of the substance 20, such as a change in volume, temperature, color, pressure, humidity, or weight.

Data 42 may provide an indication of a chemical component of the substance 20. For instance, it may be desirable to know the chemical composition of the substance to make decisions regarding the environmental conditions of the substance 20, among other reasons. Data 42 may include range information for the attribute indicating acceptable and unacceptable measurements of the attribute or what measurement levels trigger a notification to the control unit 24, a notification to a user, or another activity.

Data 42 may include date and time values such as a date and time that the container 16 was first opened, a date and time that the container 16 was last opened, a data and time that the substance was processed or packaged at a processing facility. Data 42 may include manufacturing or processing information such as a name of the producer of the substance 20, a trade name of the substance 20, a generic name of the substance 20, an identifier of the processing facility that processed the substance 20, a batch number of the substance 20. Data 42 may include nutritional and health information such as an indication of the nutritional attributes of the substance 20, an indication of the presence of allergens associated with the substance 20, and an indication of a dosage of the substance 20.

Data 42 may provide information for use in the determination of one attribute of a substance from the measurement of one or more other attributes by the sensor 34. For example, the amount of the substance 20 may be calculated or determined from a lookup table mapping the output of a sensor 34 that measures distance to the amount of the substance 20. Data 42 may be used to regulate and track usage or aging of the substance 20 by providing a history of the measurement of attributes of the substance 20. The Data 42 may include an indication of a permitted user of the substance 20, information about replacement of the substance 20, or hyperlinks or contact information for further information about the substance. As will be discussed in more detail below, an attribute sensing device 30 may include additional sensors and accessory modules and may be in communication with other attribute sensing devices and databases. Accordingly, data 42 may provide an indication of an ideal environmental condition of the substance 20, an output from an additional sensor, or a control parameter for an accessory module.

Processor 40 processes the output of the sensor or passes the output of the sensor to the transmitter. The processor may also provide some of the data 42, such as the identifier, to the transmitter 36.

Transmitter 36 receives the output of the processor 40 and may transmit information about container 16. Transmitter 36 may communicate wirelessly with receiver to transmit the information about container 16. In one exemplary approach, the communication of transmitter 36 is unidirectional with all transmissions originating from transmitter 36. However, other exemplary approaches may include a receiver transmitter 36 for implementing bi-directional communication.

Transmitter 36 may use various transmitting technologies. In one exemplary approach, transmitter 36 may be a radio frequency (RF) transmitter. RF transmitters emit signals in the radio frequency range of the electromagnetic spectrum. Within the domain of RF transmitters, any of a number of RF transmission standards may be employed by transmitter 36. The RF transmission standard generally defines the signal strength, frequency, data throughput, and communications protocol. Low power RF standards, such as Bluetooth®, Zigbee®, Wibree™, enOcean®, Z-wave® etc., are ideally suited for attribute sensing device 30. In other exemplary approaches requiring greater data rates or transmission range, a radio frequency transmitter operating according to the wi-fi or wi-max transmission standards may be employed.

In yet another exemplary approach, transmitter 36 may be a radio frequency identification (RFID) circuit. In such an approach, an RFID circuit may act as both transmitter 36 and power source 38. The RFID circuit may include an antenna for transmitting RF signals. The antenna may also inductively generate electrical power when in the presence of an operating RFID reader.

In another exemplary approach, transmitter 36 may be an IR transmitter. The IR transmitter may include an IR diode that can produce an IR signal. The IR signal may then be received by a photoelectric receiver included with control unit 24.

In yet another exemplary approach, transmitter 36 may be an acoustic transmitter. For instance, transmitter 36 may be a speaker configured to audibly transmit the output of sensor 34. Transmitter 36 may announce the amount of substance 20 contained in container 16.

While not depicted in the drawing figures, transmitter 36 may require an aperture in outer portion of lid 18. For instance, a non-metal aperture in a metal lid 18 may facilitate the transmission of radio frequency signals. Similarly, an IR transmitter may require a transparent or translucent aperture for the passage of the infrared signals and may further include a lens with the aperture.

The power source 38 may provide electrical power to transmitter 36, sensor 34, and processor 40. The storage and use environment 10 generally cannot accommodate a plurality of containers 16 wired to a power source 38. Accordingly, power source 38 may be a wireless power source allowing attribute sensing device 30 to be self-contained and in some exemplary approaches, self-sufficient. Moreover, a variety of wireless power sources may be employed as power source 38.

The power source 38 may be a power storage device, an energy harvesting device, or a combination of both. Exemplary energy storage devices include a battery, a flywheel, or a capacitor. Energy harvesting devices include electromechanical power generators and mechanical energy harvesting generators.

Electromagnetic power generators include solar cells and RFID circuits. Alternatively, a thermoelectric generator may rely on a temperature gradient between two conducting materials to produce a current.

Energy harvesting techniques may include an inductive generator, a piezoelectric generator, a thermoelectric generator, a kinetic micro-generator an electro-chemical generator and combinations thereof. Energy may be harvested, for example, from motion, forces, temperature gradients, ambient sources or a combination thereof.

An inductive generator may generate power from the movement of the lid. A source of magnetic flux may be associated with one of the lid and the jar and a flux responsive device may be associated with the other of the lid and the jar. The source of magnetic flux may be one or more permanent magnets attached to a surface of container 16, such as the rim of container 16. The flux responsive device may be a conductive coil extended along a circumferential surface of the lid, such as a lip portion of lid 18 that overlaps the rim of container 16. Spinning lid 18, which may be necessary to unscrew a screw-on lid, passes the coil through the magnetic fields provided by the magnets, which in turn induces a voltage between the ends of the coils.

A piezoelectric generator employs a material that demonstrates a piezoelectric effect. Applying a force or strain to the piezoelectric material may produce electrical energy that can be used by the elements of sensing device 30. A thermoelectric generator may rely on a temperature gradient between two conducting materials to produce electrical energy.

Kinetic micro-generators may employ a moving element such as a pendulum, piston, flywheel, etc. to charge a capacitor which may in turn provide an electrical output. The moving element may cause an attached magnet to oscillate in the presence of a coil, which in turn charges the capacitor. The capacitor may then be discharged at the time the device 20 needs to be powered. A kinetic micro-generator may use piezoelectrics to harvest energy from ambient mechanical vibration.

A kinetic micro-generator may convert ambient vibration into electricity by placing magnets along a beam that is configured to vibrate in response to the ambient vibration. As the beam vibrates, the magnets move in response and move relative to a coil in proximity to the beam and the magnets. As the magnets move relative to the coil, electro-magnetic induction causes current to flow in the coil. The current flow is the electric energy.

Solar cells and kinetic micro-generators are examples of power sources that derive their power from the natural ambient environment.

Power source 38 may combine a power generator with power storage to provide access to power at times when the generator is not generating power, such as to provide a delay in the activation of the sensor from the time that the power is generated.

Power source 38 may provide power in response to accessing the substance of the container 16 or changes in the environment of the container that result in the generation of power. Moreover, the time that container 16 is accessed is an ideal time to power attribute sensing device 30 to determine such attributes indicative of the amount of substance 20 or the quality of the substance 20 because container 16 is generally accessed for the purpose of removing a portion of substance 20 and using the substance for some purpose. Therefore, attribute sensing device 30 may be able to not only determine the attribute of substance 20, but also may be able to calculate the change in the attribute with each access to container 16.

The choice of power source 38 may affect the specific time that attribute sensing device 30 determines the amount of substance 20. For instance, a solar cell based power source may generate electrical power when container 16 is removed from an enclosed area such as refrigerator 12 or cabinetry 14 and exposed to a light source. A piezoelectric generator may generate electrical power as a result of the force or strain place on lid 18 during its removal. An RFID circuit may generate electrical power when exposed to an RFID reader. A thermoelectric generator may generate electrical power due to the temperature differential created when a container 16 is removed from refrigerator 12. While the power sources 38 just discussed may be able to automatically generate electrical power during the opening or closing of container 16, a battery based power source 38 may require the inclusion of an additional element in attribute sensing device 30 such as a switch or an accelerometer in order to sense the opening or closing of container 16.

In summary, the power source 38 provides power to the attribute sensor 34 which provides an output indicative of the attribute to the processor 40. The processor 44, also powered by power source 38, further processes the output of sensor 34 for the transmitter 36 or passes on the output of sensor 34 to the transmitter 36. The processor 44 may output additional information, such as an identifier, to the transmitter 36.

Control unit 24, illustrated in FIG. 1, may be provided with a receiver, not shown, to receive and process data from multiple attribute sensing devices 30. The control unit 24 may store, process and/or display the information received from the attribute sensing devices 30 to produce additional information. The control unit 24 may convert received attribute information to a different type of attribute information. For example, an attribute sensing device 30 may output distance Δ to control unit 24 and control unit 24 may calculate the amount of substance 20, the time for replacement of the substance, or the calories of substance consumed since the last measurement based on distance Δ. Control unit 24 may aggregate data from a plurality of attribute sensing devices to generate additional information such as information about the inventory, quality, life cycle of various substances in the storage and use environment 10.

Control unit 24 may have display 26 or other output device for communicating information derived from attribute sensing devices 30, including derived inventory, status reports, recommendations, warnings and other data.

Control unit 24 may further have a control interface 28, such as a keypad, for inputting additional data and for requests for reports and information. In another exemplary embodiment, display 26 and control interface 28 may be integrated. In addition, Control unit 24 with Display 26 and control interface 28 may function as user interface for refrigerator 12 or any other appliance like cooktops, ranges, dishwashers, washers, dryers, and the like, allowing the Control Unit 24 to send command that effect the cycle of operation of the appliance. Interface 28 may display the amount of substance 20 in container 16 or cycle information about the cycle of operation of the appliance.

For example, when introducing a new container 16 with an attribute sensing device 30 into the storage and use environment 10 or when transferring an attribute sensing device 30 to a new container 16, it may be desirable to associate data 42, such as an identifier, on the attribute sensing device with the new container 16 or the new substance 20. Control unit 24 may control the association of identifiers to particular containers 16 or substances 30. Control interface 28 may be used for entering the new data. The data may be entered manually or the control interface 28 may include a bar code reader or other device for reading information from the container 16 or the sensing information from the substance 20. If the attribute sensing device is equipped for two way communications, then the data entered at the control interface 28 may be transmitted to the attribute sensing device 30 and stored in the data 42. Moreover, in a kitchen 10 with multiple containers 16, display 26 may show the amounts of substance 20 for each container. Data 42 may include an identifier to assist the control unit 24 and the user in determining the amount of substance 20 associated with a particular container 16. Control unit 24 may allow a user to associate an identifier with a particular substance. For instance, if container 16 may be refilled with multiple different substances 20, control unit 24 may allow the user to associate a name or label with an identifier.

Figure 3:
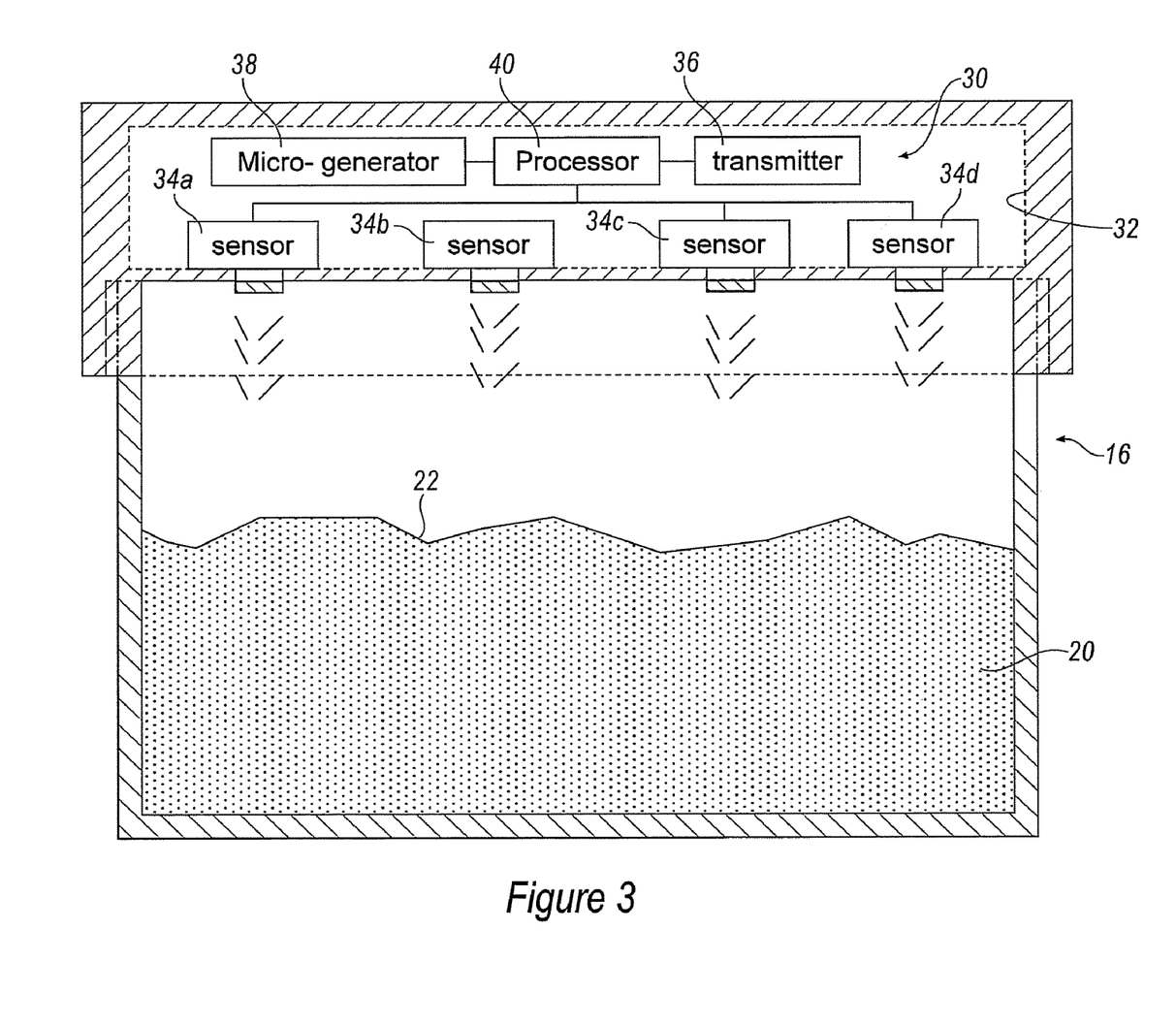
FIG. 3 is a partially schematic side, cut away, exploded view of a container including an alternate attribute sensing device to sense the attribute of substance in the container.

FIG. 3 illustrates another exemplary attribute sensing device 30*a*. Non-liquid substances 30 may have a non-uniform surface 22. Accordingly, sensing distance Δ from multiple positions may allow for a more accurate determination of the amount of substance 20. FIG. 3 provides an example of an attribute sensing device having multiple sensors 34*a*, 34*b*, 34*c* and 34*d* to determine the height of substance 20 at 4 different locations.

Figures 4A, 4B, 5:
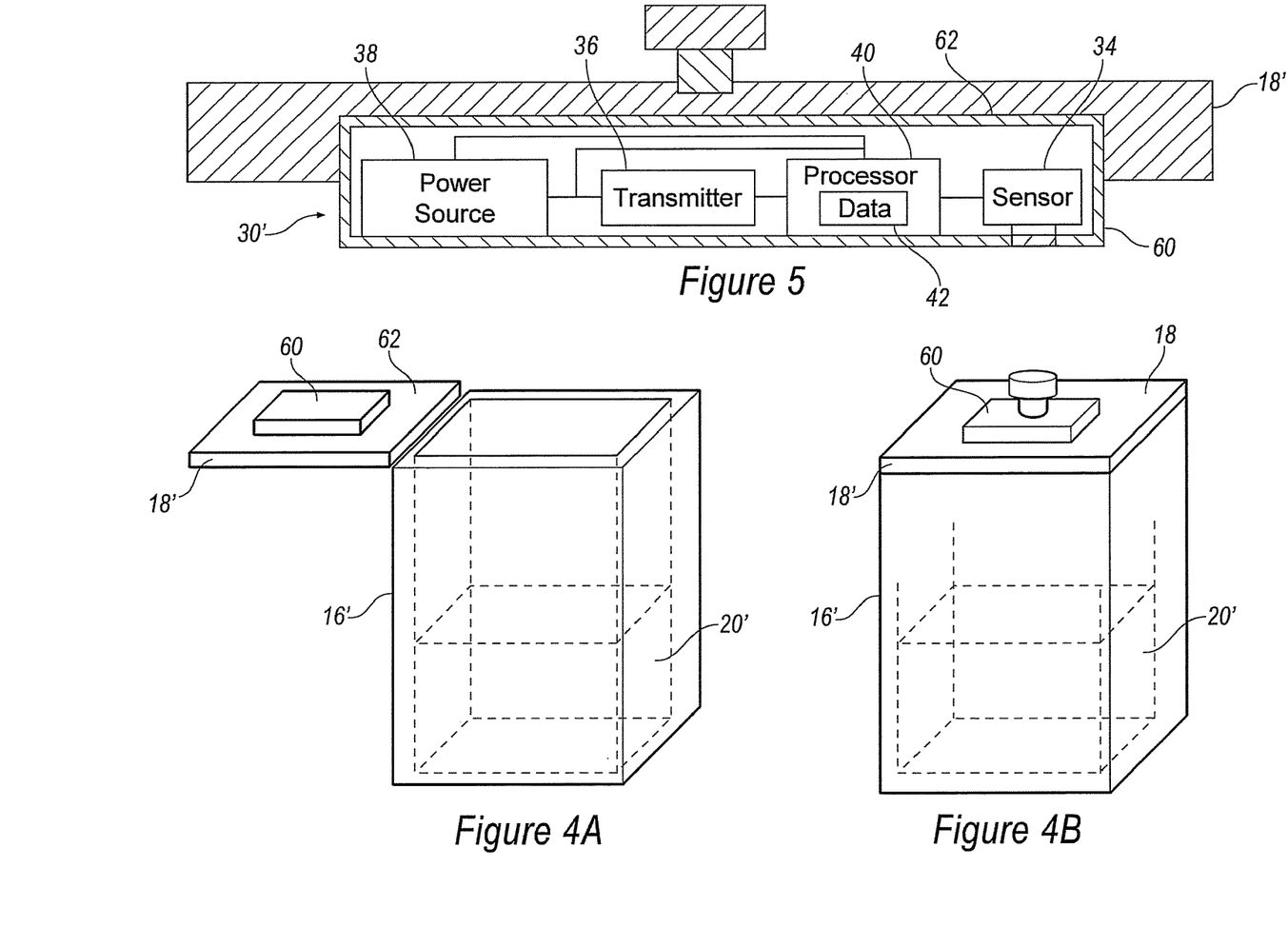
FIG. 4A is a perspective view of another exemplary container including a lid based attribute sensing device showing the lid in its open configuration.
FIG. 4B is a perspective view of the exemplary container of FIG. 4A showing the lid in its closed configuration.
FIG. 5 is a side, cut away view of the lid and lid based attribute sensing device of FIGS. 4A and 4B.
Figure 6A:
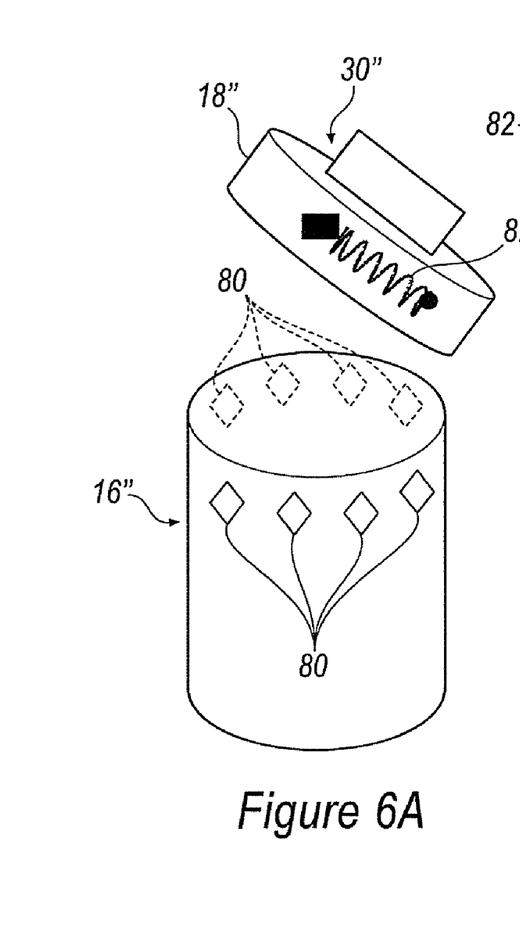
FIG. 6A is a perspective view of another exemplary container including an attribute sensing device including magnets disposed about the rim of the opening and a coil based micro-generated disposed on the lid.

In another example, shown in FIGS. 4A, 4B and 5, an attribute sensing device 30' housed in an enclosure 60 may be fixedly or removably attached to inner surface 62 of a lid 18' hingedly mounted to a container 16' with a square cross section (i.e. container 16 of FIG. 6A-6C). It will be appreciated that a different type of mechanical energy harvesting device may be appropriate for a lid 18' that undergoes a pivoting motion for opening the container than would be appropriate for a lid that undergoes a rotary motion, such as those described above.

In general, different transmitters 36, sensors 34 and power sources 38 may be appropriate for different purposes. Storage and use environments 10 will have different infrastructures and different transmission conditions which can affect the type of transmitter that may be appropriate. For some applications, a transceiver may be required. Different types of sensors 34 may be required for different storage and use environments 10, for different types of users and for different substances 20. Different power sources 38 may required for different measurement purposes, for different types of containers 16 and for different environments. For example different containers may require different types of micro-generators or at least function better with different types of micro-generators. For example, a screw on lid may require a different type of generator than a flip top box or a snap fit plastic containers.

Figure 6B:
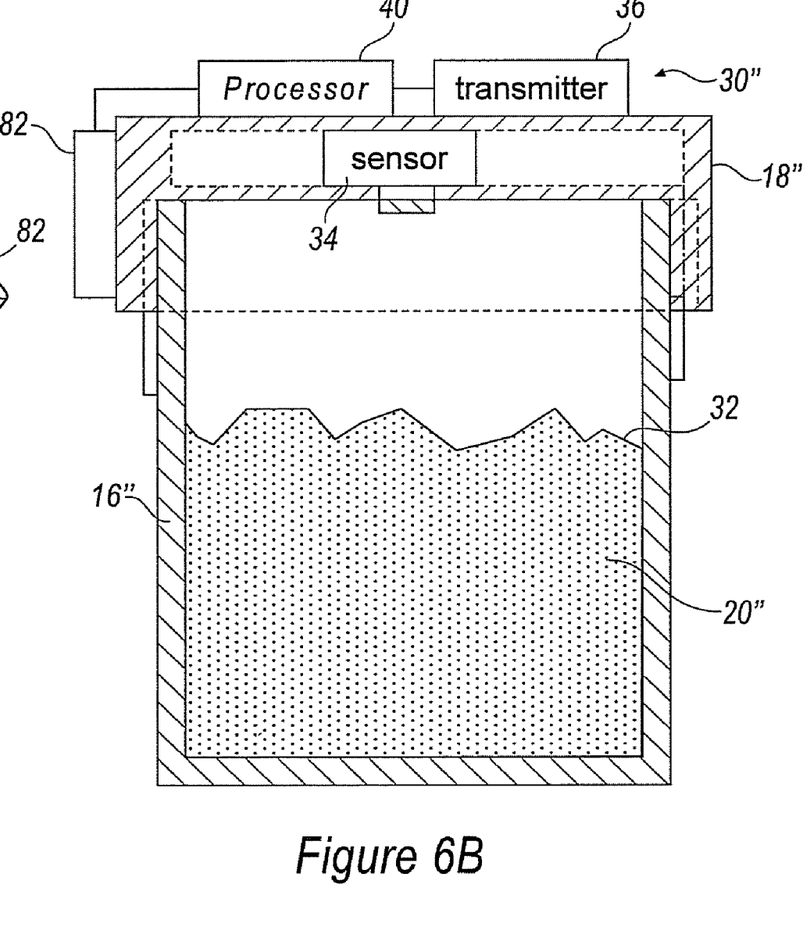
FIG. 6B is a side, cut away view of the container of FIG. 6A further depicting exemplary elements of the attribute sensing device included in the lid.

FIGS. 6A and 6B depict still another exemplary container 16" including an amount sensing device 30" associated with the lid 18". The container 16" includes a micro-generating power source that includes a plurality of magnets 80 and a coil 82. The configuration of the coil 82 and magnets 80 disposed about lid 18" may generate electrical energy when opening or closing container 16". For instance, the plurality of magnets 80 could be disposed about the rim of container 18. The coil 82 may then be provided in a lip portion of lid 18" that overlaps the rim of container 18. Spinning lid 18", which may be necessary to unscrew a screw-on lid 18, passes the coil 82 through the magnetic fields provided by the magnets 80, which in turn induces a voltage between the ends of the coils. A diode blocking current in one direction may allow for the activation of the device only during a closing or opening event rather than during both. This may allow for consistent sensor readings, i.e., only during the closing of the container. The magnets 80 may be removable from container 16" in order to be used with another container 16". For instance, the magnets 80 may be provided in a tape with an adhesive backing to facilitate the installation on the container 16".

FIGS. 7A-7F provide flowcharts depicting exemplary steps and decisions related to determining the amount of a substance stored in the container. It will be appreciated that each of these steps may be implemented by an attribute sensing device such as those described above or by other devices.

Figure 7A:
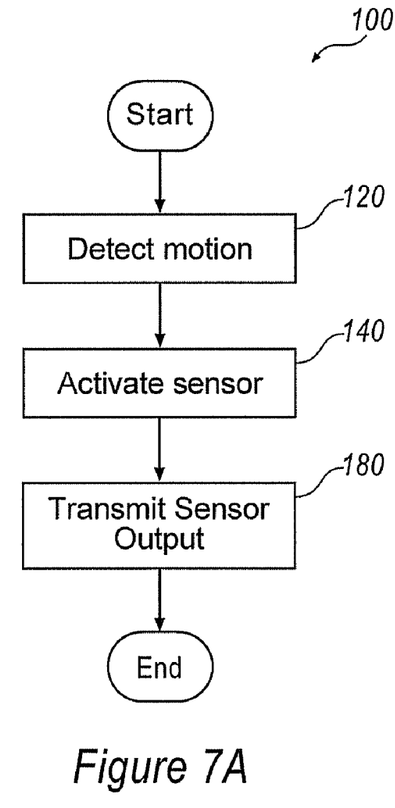
FIGS. 7A-7F are flowcharts depicting alternative steps in exemplary processes for determining the attribute of substance in a container using an attribute sensing device.

FIG. 7A depicts an exemplary process 100 for access based activation of a sensor and remote notification. Process 100 begins in step 120 with the detection of access of the substance in a container, such as by detecting the motion of the lid of the container. In step 140, a sensor is activated to take a reading of an attribute of the container, such as the amount of substance in the container. In step 180, the output of the sensor is transmitted for use by a remote device.

Figure 7B:
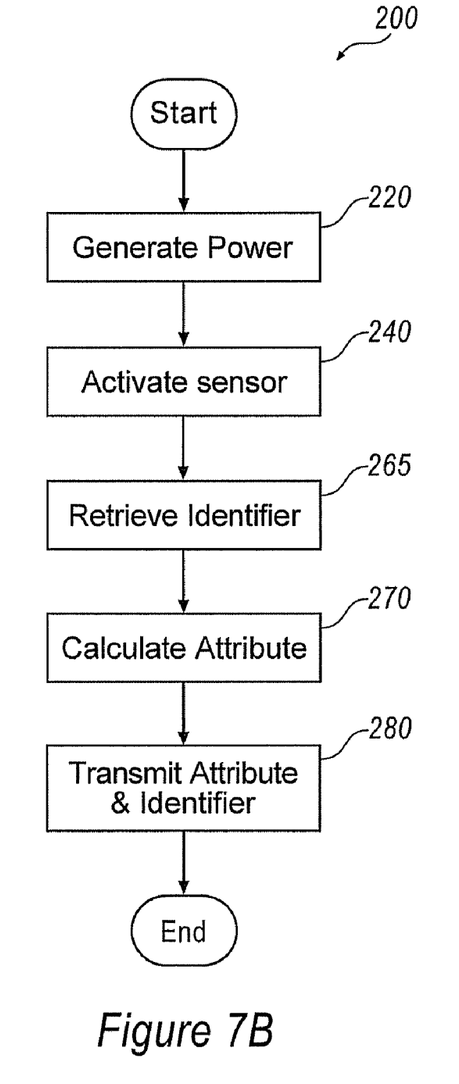

FIG. 7B depicts an alternative exemplary process 200 for access based activation of a sensor and remote notification. Process 200 begins in step 220 with the generation of power resulting from the activity associated with gaining access to the substance in a container, such as by one the various energy harvesting devices described above or by other devices. In step 240, a sensor is activated to take a reading of an attribute of the container, such as the amount of substance in the container. In step 265, identifier information is retrieved from data storage. In step 270, the output of the sensor is processed to result in information about a useful attribute, such as by averaging the height measurements of multiple sensors or converting height information into amount information. In step 280, the identifier and the calculated information is transmitted for use by a remote device.

Figure 7C:
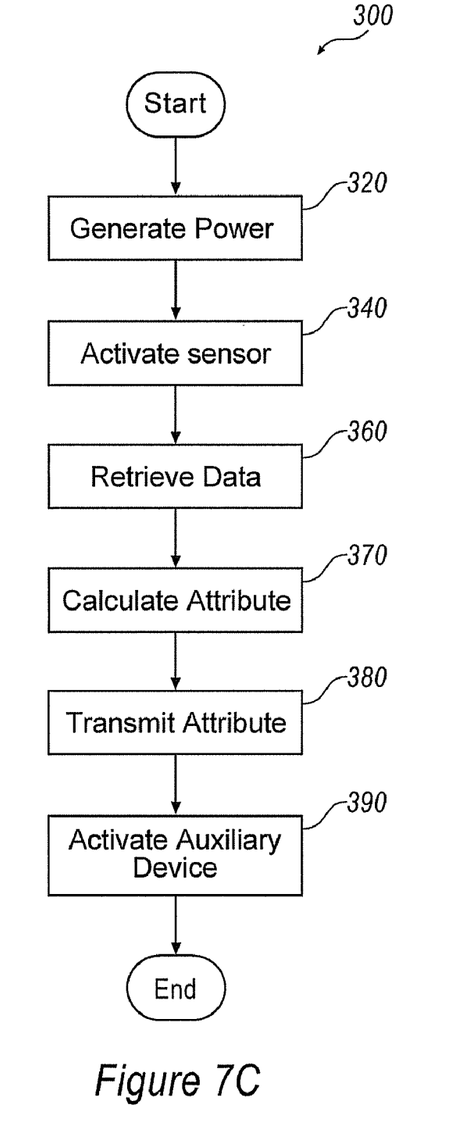

FIG. 7C depicts an alternative exemplary process 300 for access based activation of a sensor and remote notification. Process 300 begins in step 320 with the generation of power resulting from the activity associated with gaining access to the substance in a container. In step 340, a sensor is activated to take a reading of an attribute of the container. In step 365, data is retrieved from data storage, such as information about the container, the contents, or the environment. The data may be locally stored or remotely accessed, such as from a control unit 24. In step 370, the output of the sensor is processed using the data to result in more information about the substance or the container, such as by combining information from multiple sensors to determine the quality of the substance. In step 380, the identifier and the calculated information is transmitted for use by a remote device. In step 390, an auxiliary device, such as motor, fan, dehumidifier, dehumidifier, dispenser, heater, cooler or mixer is activated in response to the information about the substance.

Figure 7D:
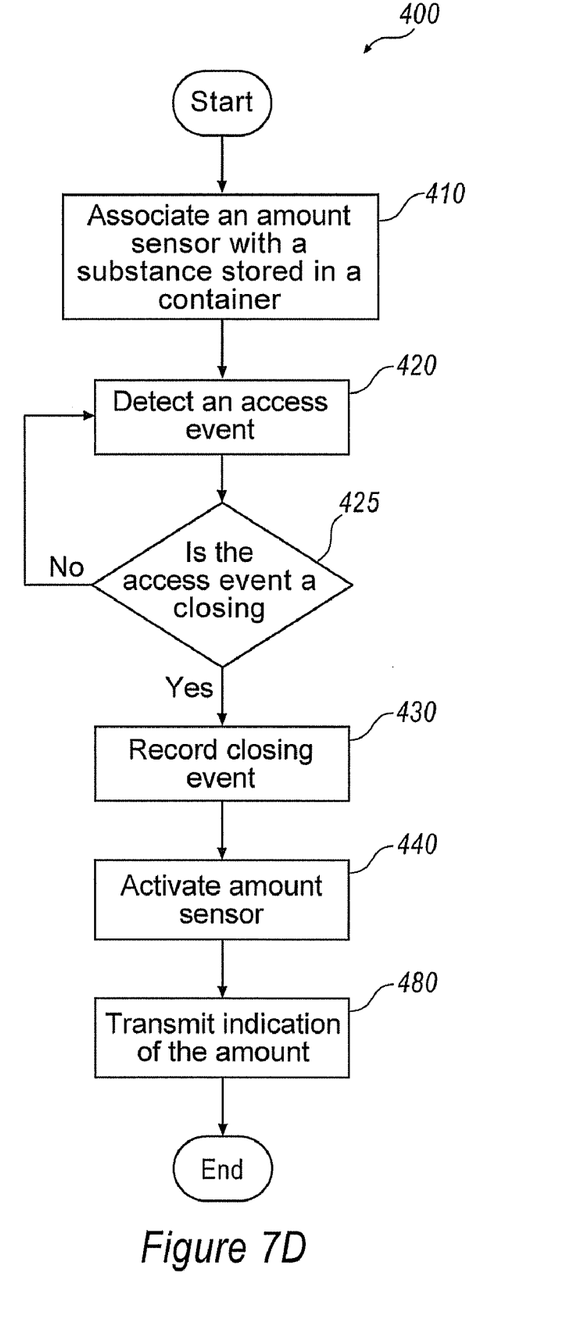

FIG. 7D depicts another alternative exemplary process 400 for access based activation of a sensor and remote notification. Process 400 begins in step 410 with associating a sensor with the substance stored in a container. This may accomplished by providing the data in a processor of an attribute sensing device with an identifier that uniquely identifies the substance, the container, the type of substance, or the source of the substance. This may be done at the time the substance is placed in the container, at the time the attribute sensing device is associated with the container or at the time the container is introduced into the storage and use 10 environment. The data in the processor of the attribute sensing device may be specific as to the substance, so that the device can transmit specific content information at the time that the information about the attribute is transmitted, or it may be simply a unique identifier without any other information. A receiving device, such as control unit 24, may have information, for example in a lookup table, to associate received information about an attribute plus the unique identifier with the nature of the substance to which the attribute relates.

The association may be recorded or stored by control unit 24 or in the data of the processor of the attribute sensing device. In one exemplary approach, containers with sensing device 20 may provide a generic and reusable storage medium. An operator may fill the container 16 any type of substance 30. Moreover, once empty, the container may be refilled with a different type of substance 30. Accordingly, the association allows the control unit 70 to track which of potentially many substances is currently being stored in container 16. A storage and use environment 10 may include multiple containers 16 each storing a substance 30. The substance stored in a container 16 may be the same or different from a substance 30 stored in a different container 16.

In another exemplary approach, a producer or processor of the substance may prepackage the substance in a container 16 that includes an amount sensor 30. In such an approach, the identifier of the sensing device 30 would be unknown in the storage and use environment 10. Accordingly, the identifier and the association to the substance would both need to be entered into the control unit 24. An initial amount of the substance 20 may be determined and stored at the time that the association is entered at the control unit 70. The initial amount may facilitate the determination of an amount added or removed at the time a container is accessed. The control unit 24 may store a brand name of substance 30, a generic name of substance 30, a name of a class of substance 30, etc. in association with the identifier.

In step 420, a possible access event is detected, such as the motion of a container, the motion or removal of a lid, or the movement of a container from a dark location into a lighted location. In step 425, the nature of the access event is probed. It is possible for some devices that the mere movement of the container is mistaken for a closing of the container. In exemplary process 400 the attribute sensor is an amount sensor and it is only desired to activate the sensor if the potential access event is the closing of a container after it has been accessed. Therefore, in step 425, an inquiry is made into whether the potential access event is truly a closing event. This can be determined a variety of ways. For example, if the detection of a potential access event is accomplished by an energy harvesting device of the type disclosed in FIGS. 6A and 6B, this can be determined by the direction of current flow generated by the rotation of the lid 18. Alternatively, this may be determined by the amount, duration and/or type of event or by detection of other events that corroborate or disprove the existence of a closing event. If the event is not a closing event, the step 425 returns the process to step 420 to await another potential access event.

If the event is a closing event, process 400 proceeds to step 430 wherein a closing event is recorded. This may be important for tracking the number of times that a container has been opened, for example, for quality purposes or for historical dispensing information. In step 440, an amount sensor is activated to take a reading of an attribute of the container reflective of the amount of substance remaining in the container after the closing event. In step 480, an indication of an amount of substance is transmitted for use by a remote device. This may be an indication of the amount consumed since the last transmission or it may be an indication of the amount of substance remaining in the container after the most recent closing event.

Figure 7E:
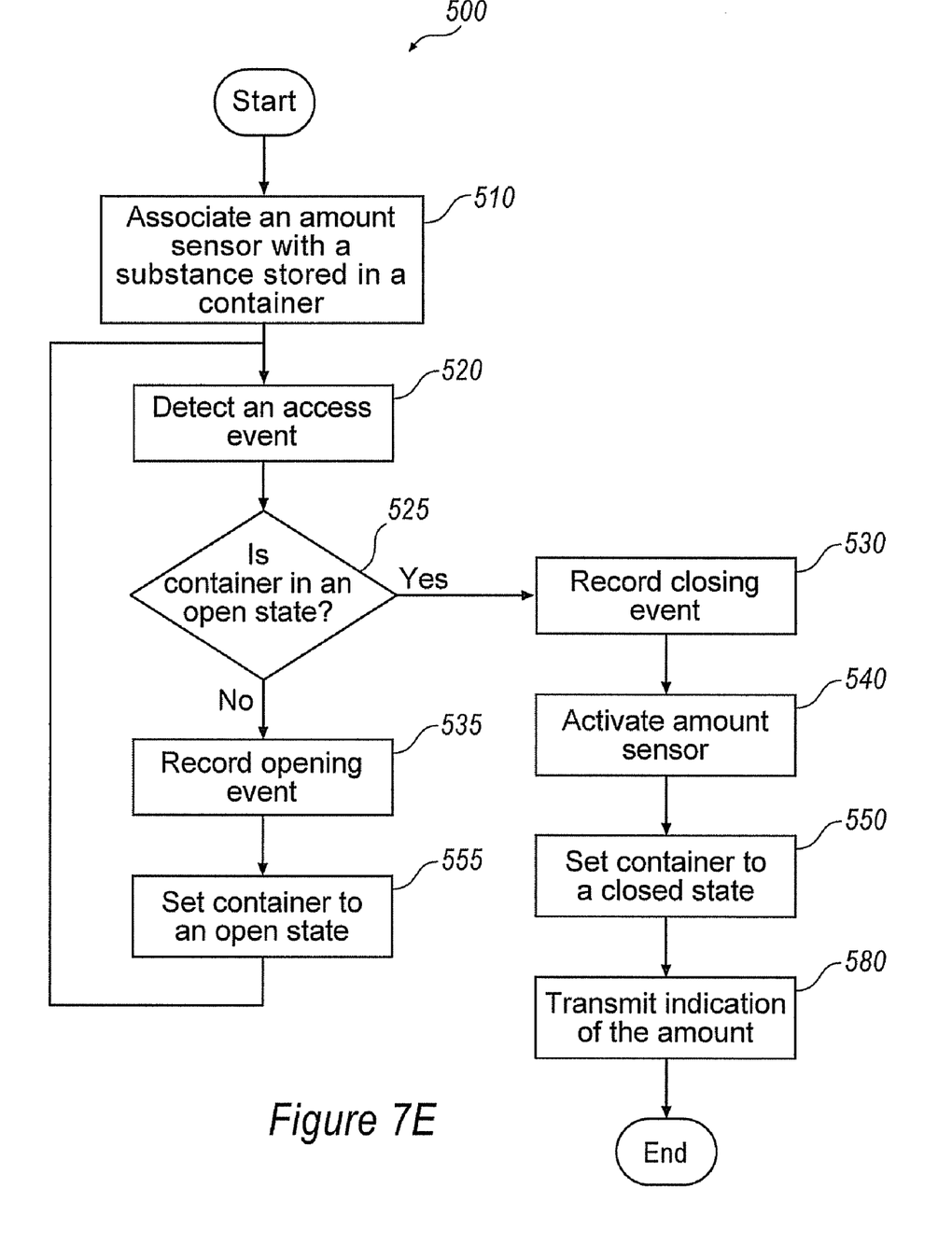

FIG. 7E depicts still another alternative exemplary process 500 for access based activation of a sensor and remote notification wherein the open or closed status of the container is tracked. Process 500 begins in step 510 with associating a sensor with the substance stored in a container. In step 520, a possible access event is detected. In step 525, an inquiry is made into whether the potential access event is a closing event. If the event is a closing event, process 500 proceeds to step 530 wherein a closing event is recorded. In step 540, an amount sensor is activated and in step 550 the container is set in a closed state, such as by setting a flag in the data of a processor in the attribute sensing device to zero. In step 580, an indication of an amount of substance is transmitted for use by a remote device. If the event is not a closing event, process 500 proceeds to step 535 wherein an opening event is recorded. In step 555, the container is set in an open state, such as by setting a flag in the data of a processor in the attribute sensing device to one.

Figure 7F:
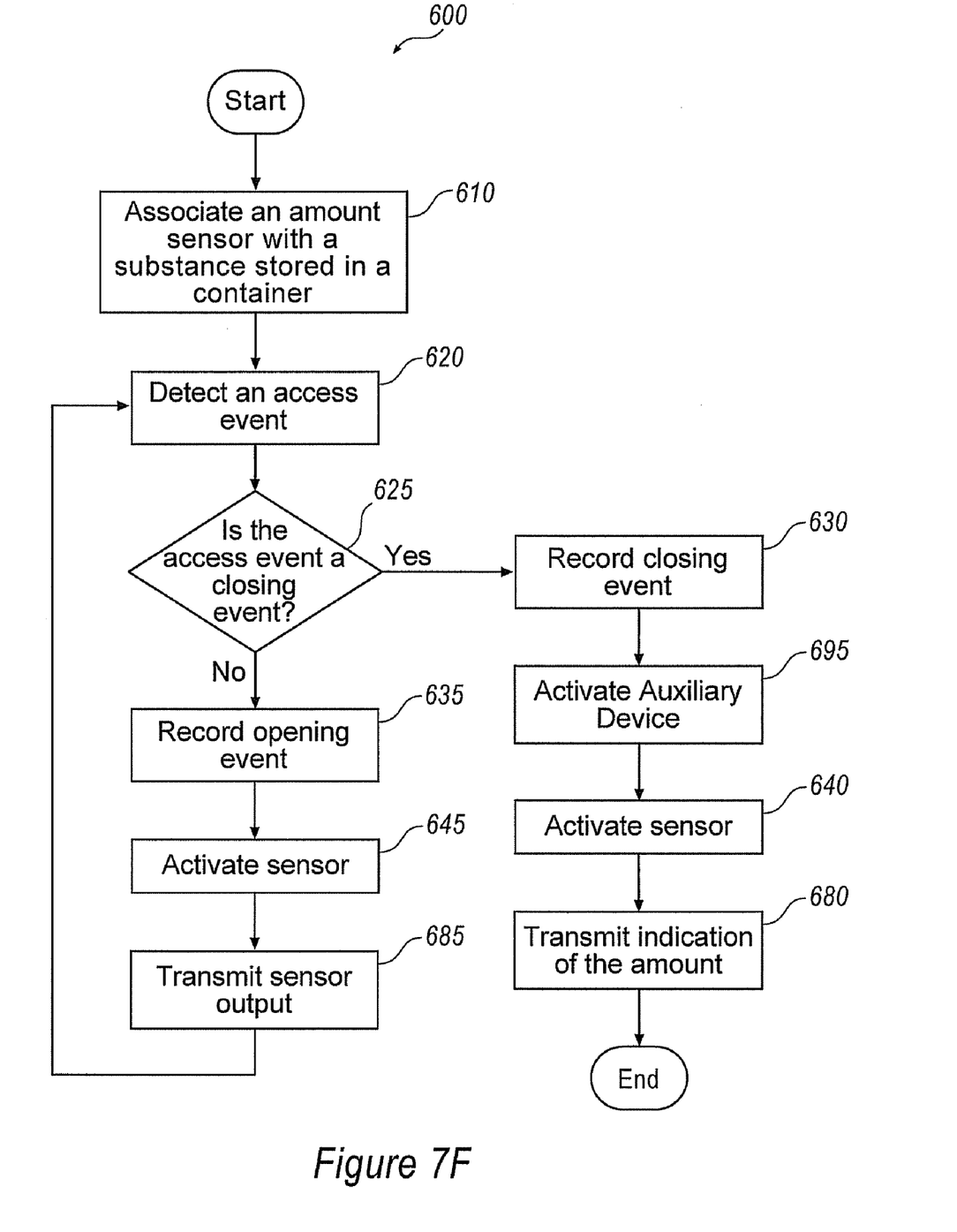

FIG. 7F depicts yet another alternative exemplary process 600 for access based activation of a sensor and remote notification wherein it is important to know whether the container is open or closed, but sensor information is desired either way. Process 600 further includes the activation of an auxiliary device, such as a device associated with the attribute sensing device to process the substance at the time of a closing event.

Process 600 begins in step 610 with associating a sensor with the substance stored in a container and step 620 with detecting a possible access event. In step 625, an inquiry is made into whether the potential access event is a closing event. If the event is a closing event, process 600 proceeds to step 630 wherein a closing event is recorded, followed by step 695 wherein an auxiliary device is activated. In step 640, a sensor is activated and in step 680, the sensor output is transmitted. If the event is not a closing event, process 600 proceeds to step 635 wherein an opening event is recorded, to step 645 wherein a sensor is activated, and then to step 685 wherein the output of the sensor is transmitted. The sensors activated in steps 640 and 645 may be the same sensor, such as a temperature sensor, or they may be different types of sensors. For example, the sensor activated in step 640 may be for the purpose of measuring an attribute of the substance in the container while the sensor activated in step 645 may be for the purpose of measuring an attribute of the environment outside of the container to which the substance is exposed during an access event.

In any of the processes described above and shown in FIGS. 7A-7F, the transmitted information may be subsequently processed by a remote receiving device, such as control unit 12, to generate aggregate information about various substances in various containers and/or a history of information about a substance in a container. The transmitted information or the processed information may be used for various purposes such as to provide warnings or notifications to users, prepare lists of action items for users, such as shopping lists and menu suggestions.

It is intended that the following claims define the scope of the invention and that the method within the scope of these claims and their equivalents be covered thereby. This description of the invention should be understood to include all novel and non-obvious combinations of elements described herein, and claims may be presented in this or a later application to any novel and non-obvious combination of these elements.

Moreover, the foregoing embodiments are illustrative, and no single feature or element is essential to all possible combinations that may be claimed in this or a later application.

What is claimed is:

1. A method of determining an attribute of a substance in a container having a lid, the method comprising the steps of:
   providing on the container at least one sensing device, at least one transmitter, and a processor in communication with the at least one sensing device and the at least one transmitter;
   detecting an access event for the substance in the container;
   in response to the detecting of an access event, the processor activating the sensing device to sense an attribute of the substance and provide an indication of the sensed attribute to the processor; and
   in response to the sensing, the processor activating the transmitter to transmit the indication to a remote device.

2. The method according to claim 1, further comprising before the step of accessing, the step of associating the sensing device with the substance.

3. The method according to claim 2, wherein said step of associating includes at least one of physically associating the sensing device with the container and relationally associating identifiers.

4. The method according to claim 1, further comprising communicating an identifier with the indicator.

5. The method according to claim 1, wherein the indication of the attribute is an indication of an amount of the substance in the container.

6. The method according to claim 5, wherein the indication of the amount of the substance is a measurement of at least one of height, weight, count, mass, and volume of the substance in the container.

7. The method according to claim 5, further comprising:
   accessing at least one characteristic of the container; and
   determining the amount of the substance in the container based on the at least one characteristic and the indication.

8. The method according to claim 7, wherein the characteristic includes a mathematic representation of the shape of the container.

9. The method according to claim 7, wherein the characteristic includes a table mapping a plurality of substance levels to respective amounts of the substance.

10. The method according to claim 7, further comprising receiving the at least one characteristic from a supplier of the container.

11. The method according to claim 1, further comprising:
    accessing at least one characteristic of at least one of the container and the substance; and
    determining an attribute of the substance in the container based on the at least one characteristic and the indication.

12. The method according to claim 11, further comprising receiving the at least one characteristic from a supplier of the container.

13. The method according to claim 1, wherein the access event includes at least one of removal of the container from a storage location, adding substance to the container, dispensing from the container, removing a lid, and affixing a lid.

14. The method according to claim 1, further comprising powering the sensing device as a result of the access event.

15. The method according to claim 1, wherein the step of communicating further comprises activating a transmitter as a result of the access.

16. The method according to claim 1, further comprising, providing the sensing device within an openable lid of the container.

17. The method according to claim 1, further comprising after the step of detecting at least one additional step comprising at least one of:
    determining if the access event is an opening event or a closing event;
    recording the access event;
    determining if the container is in an open state or a closed state;
    activating an auxiliary device;
    setting the open/closed state of the container; and
    generating power for activating a device as a result of the access event.

18. The method according to claim 1, further comprising activating an auxiliary device in response to one of opening and closing the lid.

19. The method according to claim 1, further comprising recording at least one of opening of the lid in response to detection of the opening of the lid and closing of the lid in response to detection of the closing of the lid.

20. The method according to claim 1, further comprising setting the container to an open status in response to detection of the opening of the lid and setting the container to a closed status in response to detection of the closing of the lid.

21. A method to determine an attribute of contents of a portable container, comprising:
    providing on the container at least one sensing device, at least one transmitter, and a processor in communication with the at least one sensing device and the at least one transmitter;
    placing the portable container in a storage and use environment;
    the processor activating the sensing device to sense an attribute of the contents in response to detecting a triggering event; and
    the processor activating the transmitter in response to the activating the sensing device, to transmit an identifier and information derived from the sensing device providing an indication of the attribute of the contents.

22. The method according to claim 21, wherein the triggering event comprises an access event.

23. The method according to claim 21, wherein the storage and use environment comprises at least one of a pantry, walk-in refrigerator, shelving, a trunk, a lunch box, a cabinet, a drawer, an oven, an interior compartment of an appliance, a dryer, a swimming pool, a hot tub, a water service room, a pool house, a supply closet, an engine compartment, a building, a room, a laboratory, a kitchen, a laundromat, and a restroom.

24. The method according to claim 21, further comprising:
    associating an identifier with information derived from the container;

receiving the identifier with an output of the sensing device; and associating the information with the identifier.

25. The method according to claim 21, further comprising providing a wireless transmitter coupled to the sensing device and wherein the transmitting an identifier and information derived from the sensing device includes communicating between a wireless receiver and the wireless transmitter.

26. A method to remotely determine an attribute of a substance in a container, comprising:

associating an identifier of at least one of the container and the substance in a remote data system;

detecting an access event;

the remote data system receiving the identifier and an output transmitted by a transmitter provided on the container of information from a sensor provided on the container providing an indication of the attribute of the substance; and associating the information with the identifier in the remote data system.

27. The method according to claim 26, wherein the indication of the attribute is an indication of an amount of the substance in the container.

28. The method according to claim 26, wherein the indication of an amount of substance is a measurement of at least one of height, weight, and volume of the substance in the container.

29. The method according to claim 26, further comprising:

accessing a characteristic of at least one of the container and the substance; and determining an attribute of the substance in the container based on the characteristic and the indication.

30. The method according to claim 26, wherein the access event includes at least one of removal of the container from a storage location, adding substance to the container, dispensing from the container, removing a lid, and affixing a lid.

31. The method according to claim 26, further comprising associating the identifier with contents in the container.

32. The method according to claim 26, further comprising after the detecting, the steps of:

determining if the access event is an opening event or a closing event; and recording the access event.

33. The method according to claim 26, further comprising after the detecting, the steps of:

determining if the container is in an open state or a closed state; and activating an auxiliary device if the container is in closed state.

34. The method according to claim 26, further comprising after the detecting, the steps of:

determining if access event is an opening event or a closing event; and activating an auxiliary device if the access event is a closing event.

* * * * *